(No Model.)
W. E. BUTLER.
WHEEL CULTIVATOR.
No. 276,766. Patented May 1, 1883.
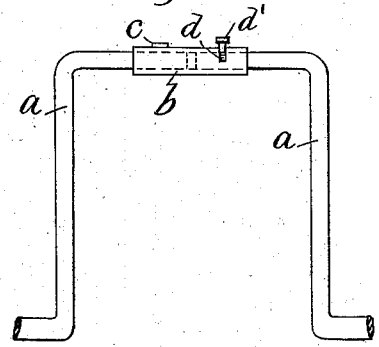
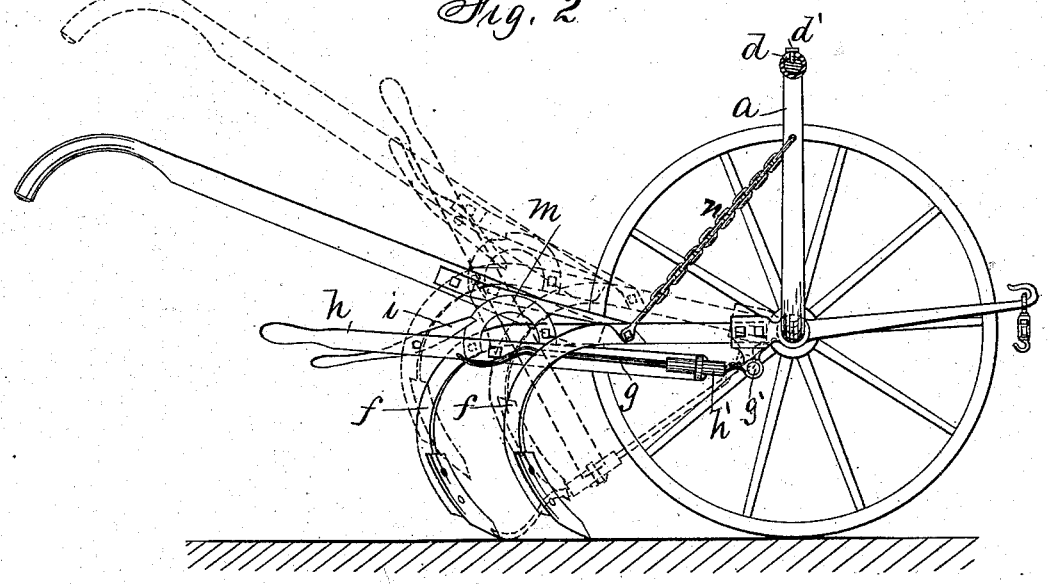
Witnesses:
N. F. Percival
H. A. Stoltenberg
Inventor:
William E. Butler,
By Thomas G. Orwig,
Attorney.
N. PETERS. Photo-Lithographer, Washington, D. C.

UNITED STATES PATENT OFFICE.

WILLIAM E. BUTLER, OF UNION, IOWA.

WHEEL-CULTIVATOR.

SPECIFICATION forming part of Letters Patent No. 276,766, dated May 1, 1883.

Application filed September 28, 1882. (No model.)

*To all whom it may concern:*

Be it known that I, WILLIAM E. BUTLER, of Union, in the county of Hardin and State Iowa, have invented an Improved Straddle-Row Cultivator, of which the following is a specification.

My invention relates to that class of cultivators that are constructed and operated without tongues in such a manner that there will be flexion in the axle and carriage to allow each horse to move its own plow independently of the other to a certain extent, so that when either of the horses on the opposite sides of a row of plants moves faster than the other or deflects from the line of draft it will not affect the direct line of advance of the plows, that are required to remain parallel with and a proper distance from the plants in the row.

It consists in combining a drag or runner and a hand-lever with each plow-frame in such a manner that the plows or shovels attached to the frame can be readily elevated and supported in an inoperative position, as hereinafter fully set forth.

Figure 1 of my accompanying drawings is a view of detachably-connected sections of an arched axle. Fig. 2 is a side view of a half-section of my complete machine, showing my drag-runner and hand-lever connected with the plow and carriage. Together these figures clearly illustrate the construction and operation of my complete invention.

$a$ $a$ represent the top and inner ends of a divided arched axle.

$b$ is a tube or sleeve corresponding in size with the ends of the axle that are passed into it from opposite directions.

$c$ represents a set-screw or bolt, by means of which the sleeve $b$ is rigidly fastened to one of the axle-sections $a$.

$d$ is a transverse slot near one of the ends of the sleeve.

$d'$ is a stud or screw passed through the slot $d$ and screwed into the axle-section $a$ to prevent any longitudinal movement of the two sections thus coupled together relative to the sleeve, and also a restricted flexure to the complete arched axle and carriage.

$f$ $f$ represent the beams and frame of a double-shovel plow and cultivator, adjustably connected with the arched and jointed axle $a$ $a$ in such a manner as to allow them vertical and also lateral motion relative to the axle and complete carriage.

$g$ is a drag-runner, made of round or square iron, and hinged to the coupling or the axle $a$ by means of a loop, $g'$, that is fixed to the axle.

$h$ is a straight bar, pivoted to or suspended from the plow-frame or one of its beams $f$ in such a manner that it can be used as a lever of the first order to raise and lower the complete plow. $h'$ represents a sleeve or slide swiveled to the end of the short arm of the lever $h$, and through this tubular slide the drag-runner $g$ is extended from its front and hinged end rearward.

$i$ represents a spring pawl, bolt, or latch, pivoted to the long arm of the lever $h$ in such a manner that it will in its normal condition engage a ratchet or catch device, $m$, that is fixed to one of the beams $f$ in such a position relative to the lever and pawl that it will receive and retain the pawl when the lever is in a horizontal position.

$n$ represents a chain or other suitable flexible stay, fastened to the central portion of the plow-frame and to the arch of the axle to restrict the forward revolving motion of the arch.

To elevate and retain inoperative the shovels or plows of a cultivator thus provided with a drag-runner and lever, I simply unlatch the spring bolt or pawl $i$ from the catch $m$, and then raise the rear end and long arm of the lever $h$ to lower the free and rear end of the drag-runner to the ground by means of the slide $h'$, through which the drag-runner extends, as indicated by dotted lines in Fig. 2. The lever, pivoted to the plow beam or frame and adjustably connected with the drag-runner that rests upon the ground, is retained in a stationary position to perform the function of a prop in holding up the plow while the complete machine is advanced upon its wheels and the drag-runners.

To lower and make operative the plow I simply bear down the long arm of the lever and bring it into a horizontal position to lift the drag-runner, and to allow the spring-pawl to enter its catch and lock the complete folded device to the plow-frame, as clearly shown in Fig. 2.

I am aware that joints have been formed in arched axles, substantially as described, and that adjustable drags and runners of different forms have been combined with cultivators to elevate and retain them inoperative; but my manner of combining a lever and drag-runner with a cultivator frame and carriage is novel and greatly advantageous.

I claim as my invention—

1. In a cultivator, the combination of a drag or runner, $g$, hinged to the carriage, a lever, $h$, pivoted to the cultivator-frame, and a slide, $h'$, swiveled to the end of said lever, substantially as shown and described, for the purposes specified.

2. The drag-runner $g$, the loop $g'$, the lever $h$, the slide $h'$, the spring pawl or bolt $i$, and the catch $m$, arranged and combined with a wheel-cultivator, substantially as shown and described, for the purpose of elevating and holding inoperative the plows or shovels whenever desired.

WILLIAM E. BUTLER.

Witnesses:
A. F. DAVIS,
W. H. RODWELL.